US008504193B2

(12) United States Patent
Spiridonov et al.

(10) Patent No.: US 8,504,193 B2
(45) Date of Patent: Aug. 6, 2013

(54) SYSTEM AND METHODS FOR INCREASING EFFICIENCY IN RAPID PROTOTYPING PROCESSES

(75) Inventors: Anton Spiridonov, Moscow (RU); Shiva P Sambu, Santa Clara, CA (US); Artem Borovinskih, San Jose, CA (US); Maneesh Dhagat, San Jose, CA (US); Vasiliy Ivanov, Moscow (RU)

(73) Assignee: Align Technology, Inc., San Jose, CA (US)

( * ) Notice: Subject to any disclaimer, the term of this patent is extended or adjusted under 35 U.S.C. 154(b) by 235 days.

(21) Appl. No.: 13/159,291

(22) Filed: Jun. 13, 2011

(65) Prior Publication Data

US 2011/0245952 A1 Oct. 6, 2011

Related U.S. Application Data

(62) Division of application No. 11/831,779, filed on Jul. 31, 2007, now Pat. No. 8,019,465.

(51) Int. Cl.
*G06F 7/00* (2006.01)

(52) U.S. Cl.
USPC .......................................................... 700/223

(58) Field of Classification Search
USPC ..................................... 700/223, 28, 98, 114
See application file for complete search history.

(56) References Cited

U.S. PATENT DOCUMENTS

2008/0082944 A1 * 4/2008 Yamaguchi et al. .............. 716/4

* cited by examiner

*Primary Examiner* — Ramya Burgess
(74) *Attorney, Agent, or Firm* — Klein, O'Neill & Singh, LLP

(57) ABSTRACT

A system and methods for batch sorting objects and mapping the objects on a tray having a fixed dimension along an x-axis and a fixed dimension along a y-axis. Certain aspects of the present embodiments include (a) storing the objects in a queue; (b) sorting the objects in the queue according to a dimension of the objects; (c) mapping the objects sequentially into a first column of a plurality of columns on the tray until the first column is filled; (d) mapping the objects into a subsequent column until the subsequent column is filled; (e) repeating step (d) until only a last column in the plurality of columns remains to be filled, or until no more objects remain in the queue; and (f) mapping the objects into the last column in accordance with a column organization plan. In certain embodiments, at least one of the columns, and not necessarily the last column, includes objects mapped in accordance with a column organization plan.

47 Claims, 10 Drawing Sheets

105 TREATMENT FILES
RECEIVE MODULE 104
102 FABRICATION MODULE
106 MODEL GENERATION MODULE
108 EDITING MODULE
109 ID MODULE
110 STORAGE MODULE
112 HEIGHT SORTING MODULE
114 LAYOUT MODULE
116 SLICING MODULE
118 RP APPARATUS
100

SYSTEM AND METHODS FOR INCREASING EFFICIENCY IN RAPID PROTOTYPING PROCESSES

CROSS REFERENCE TO RELATED APPLICATIONS

This application is a divisional application of application Ser. No. 11/831,779, filed Jul. 31, 2007, now U.S. Pat. No. 8,019,465, the disclosure of which is incorporated herein in its entirety.

BACKGROUND OF THE INVENTION

1. Field of the Invention

The present invention relates to mass fabrication of customized items.

2. Description of Related Art

Batch processing is a common component of mass production processes. In batch processing the number of articles that can be processed in a single batch is limited by the working area available for positioning the batch. This working area is commonly referred to as a tray. For simplicity, the term tray will be used herein to refer to any work area. The number of items that may fit on a tray is affected by the sizes and shapes of the items. In many fabrication processes, the items that make up a batch are of varying sizes and shapes. This situation arises in the manufacture of customized items, such as, for example, plastic orthodontic alignment appliances, hearing aids, protective sports gear, medical devices, glasses, orthotic shoe inserts, and the like. Examples of orthodontic alignment appliances are described in U.S. Pat. No. 5,975,893 and U.S. Patent Application Publication No. 2005/0082703, both of which are incorporated herein by reference. Both the '893 patent and the '703 publication are assigned to the assignee of the present application.

Plastic orthodontic appliances of the type disclosed in the '893 patent and the '703 publication are manufactured as sets or series of incremental position adjustment appliances. Each series of incremental position adjustment appliances is custom made for each patient. The appliances are worn by the patient in sequence to incrementally realign and/or reposition the patient's teeth.

Molds for creating the appliances are manufactured by downloading three-dimensional CAD models of the molds to a rapid prototyping ("RP") apparatus, such as, for example, a stereolithography or photolithography machine. The manufacturing facility then creates the appliances using the molds.

The RP apparatus fabricates batches of molds. Each batch is arranged on a tray having fixed dimensions. Typically, the tray is rectangular. Computer-generated images of the molds in each batch are mapped into a computer-generated field representing the tray. In a typical RP system for fabricating orthodontic appliance molds, CAD images of the molds are stored in a memory queue. These images are then mapped onto a virtual tray having the dimensions of the actual RP apparatus on which the molds are built. In some RP systems the mapping software arranges the mold images into columns on the tray by following the same sequence in which the images are arranged in the queue. The columns are then arranged sequentially on the virtual tray. The images, which may be of varying shapes and sizes, are thus located on the virtual tray with little if any regard for the heights or widths of the images. As explained in detail below, this process results in a great deal of wasted material, and more trays must be used to fabricate a given number of molds. As the number of trays increases, so do fabrication time and cost.

SUMMARY OF THE INVENTION

The present embodiments provide a system and methods for batch sorting objects and mapping the objects on a tray having a fixed dimension along an x-axis and a fixed dimension along a y-axis. Certain aspects of the present embodiments include (a) storing the objects in a queue; (b) sorting the objects in the queue according to a dimension of the objects; (c) mapping the objects sequentially into a first column of a plurality of columns on the tray until the first column is filled; (d) mapping the objects into a subsequent column until the subsequent column is filled; (e) repeating step (d) until only a last column in the plurality of columns remains to be filled, or until no more objects remain in the queue; and (f) mapping the objects into the last column in accordance with a column organization plan. In certain embodiments, at least one of the columns, and not necessarily the last column, includes objects mapped in accordance with a column organization plan.

BRIEF DESCRIPTION OF THE DRAWINGS

The embodiments of the present system and methods for increasing efficiency in rapid prototyping processes will now be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION

The present embodiments provide a system and methods for increasing efficiency in rapid prototyping processes. The present embodiments are described herein in the context of specific implementations, for example, height sorting and mapping of computer-generated, three-dimensional images of molds on virtual trays in processes for fabricating plastic molds using an RP apparatus. More specifically, the molds are used in the fabrication of plastic orthodontic appliances. Although the orthodontic appliances described herein are generally shaped as either a U or a V, the present embodiments have utility for use with images or items of any shape or size. For example, the items may be hearing aids, protective sports gear, medical devices, glasses, orthotic shoe inserts, and the like.

Figure 1:
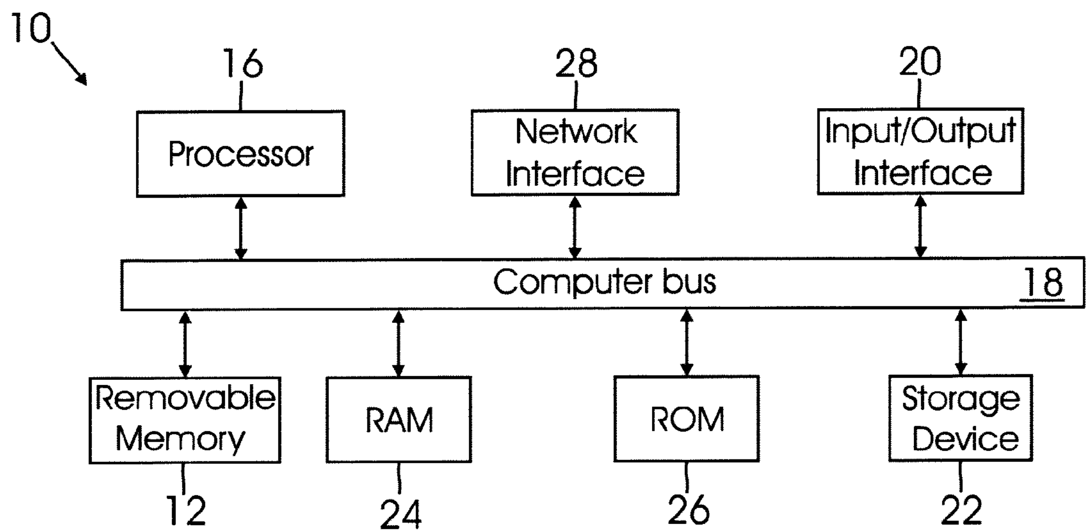
FIG. 1 is a block diagram of an example computing system with which the present system and methods may be implemented.

Certain embodiments of the present system and methods are implemented in software and executed by a computing system. FIG. 1 illustrates a block diagram of a computing system 10 that may be used to execute computer executable process steps in connection with the present embodiments. Computing system 10 includes a computer-readable memory storage device 22 for storing readable data. The storage device 22 may include a hard drive, a magnetic tape, a magnetic drum, integrated circuits, or other storage medium configured to maintain data by any means, including magnetically, electrically, optically, and other equivalent means. The storage device 22 may store operating system program files, application program files, and computer-executable process steps of the present embodiments and other files. Some of these files may be stored on the storage device 22 using an installation program. For example, a microprocessor 16 may execute computer-executable process steps of an installation program so that the microprocessor 16 can properly execute the application program. The computing system 10 may also access computer-readable data files, application program files, and computer executable process steps embodying the present system and methods via a removable memory device 12, such as, for example, a CD-ROM, a CD-R/W, a flash memory device, a ZIP® disk, a floppy disk, and the like. The microprocessor 16, the storage device 22, and the removable memory device 12 typically interface with a computer bus 18.

A modem, an integrated services digital network (ISDN) connection, or another connection may provide the computing system 10 with access to the World Wide Web (WWW), and/or to an intranet. The network connection may allow the computing system 10 to download data files, application program files and computer-executable process steps embodying the present system and methods. Also shown in FIG. 1 is an input/output interface 20 connected to the bus 18. The input/output interface 20 may operatively connect an output display device, such as a monitor (not shown), an input device, such as a keyboard (not shown), and/or a pointing device, such as a mouse (not shown).

A random access memory (RAM) 24 also interfaces with the computer bus 18 to provide the microprocessor 16 with access to memory storage. When executing stored computer-executable process steps from the storage device 22, the microprocessor 16 stores and executes the process steps out of the RAM 24.

A read only memory (ROM) 26 is provided to store invariant instruction sequences such as start-up instruction sequences or basic input/output operating system (BIOS) sequences. The ROM also interfaces with the bus 18.

The computing system 10 can be connected to other computing systems through a network interface 28 using the computer bus 18 and the network connection (if provided). The network interface 28 may be adapted to one or more of a wide variety of networks, including local area networks, storage area networks, wide area networks, the Internet, and the like.

In one aspect of the present embodiments, software for arranging items may be supplied on a CD-ROM or a floppy disc, or alternatively it may be read from a network via the network interface 28. In yet another aspect of the present embodiments, the computing system 10 may load the software from other computer-readable media such as magnetic tape, a ROM, an integrated circuit, or a magneto-optical disc. Alternatively, the layout optimization software may installed onto the storage device 22 of the computing system 10 using an installation program, and it may be executed using the microprocessor 16. In yet another aspect, the layout optimization software may be implemented by using an Application Specific Integrated Circuit (ASIC, not shown) that interfaces with the computing system 10.

In a process for the large-scale fabrication of customized plastic orthodontic appliances, a dental professional makes impressions and/or casts of a patient's upper and lower dental arches. The dental professional then sends the impressions and/or casts to an orthodontic appliance manufacturing facility. The manufacturing facility scans the impressions and/or casts (e.g., by CT scanning), and creates an electronic data file, known as a treatment file. The treatment file includes treatment information for the patient such as the scanned and digitized three-dimensional images of the impressions and/or casts, and the geometries of the incremental positioning steps or stages in the planned course of orthodontic treatment. (For some patients, the treatment information may be for only the upper or lower dental arch.)

Figure 2:
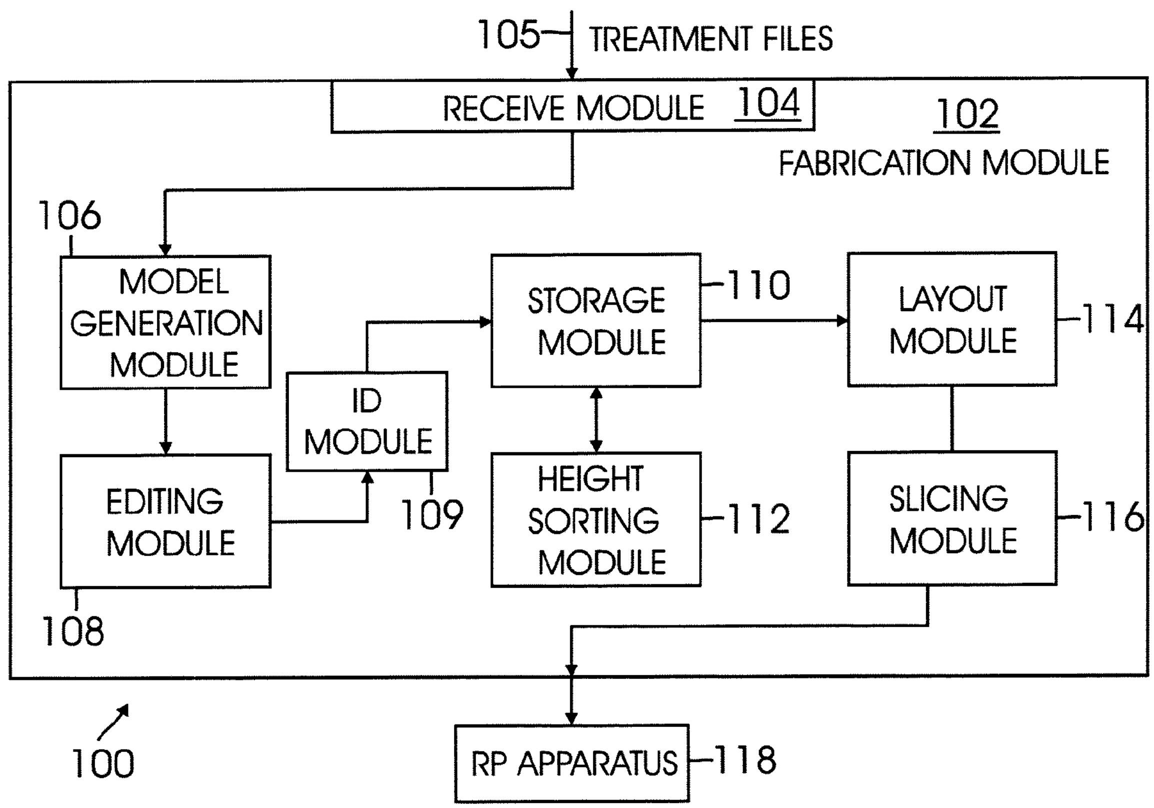
FIG. 2 is a block diagram of a system for fabricating molds according to embodiments of the present system and methods.

FIG. 2 illustrates a block diagram of a system 100 for fabricating orthodontic appliance molds. The system 100 may incorporate embodiments of the present system and methods for mapping mold images on a virtual field or virtual tray. Those of ordinary skill in the art will appreciate that the tray may have any shape. However, for simplicity the tray will be described herein as being rectangular. The tray lies in a three-dimensional space defined by an x-y-z coordinate system, with a plane defined by the tray being perpendicular to the z-axis. The tray has fixed dimensions in the x and y directions.

The system 100 includes a plurality of software modules, including a fabrication module 102. The fabrication module 102 includes a receiving module 104 for receiving data or treatment files 105 that have been approved by the dental professional. The treatment files 105 may include treatment information such as that described above. The receiving module 104 transmits the treatment files 105 to a model generation module 106, where three-dimensional, digitized graphic images or virtual models of the molds are generated. The virtual models or images may then advantageously be transmitted to a shelling or editing module 108, where the virtual models are edited to remove selected portions of the image data that are not needed in performing the subsequent steps. In the context of dental arch mold images, the shelling module 108 may remove parts of the image representing tissue in the interior of the dental arch. By removing these portions the molds may be manufactured with at least some hollow portions to conserve material.

At least one unique identifier may advantageously be associated with and incorporated into each of the mold images. This step, if performed, may be performed by an ID module 109 that operates on the shelled or edited images from the shelling module 108. Alternatively, this step may be performed by the shelling or editing module 108 in conjunction with the above-described shelling or editing step. If an identifier is applied, two unique identifiers may be used. Both identifiers uniquely associate each mold with a particular patient, so that each patient receives the correct set of appliances. The first identifier may be a printed number that is readable by humans. The second identifier may be a machine-readable barcode, which may contain information in a one-dimensional format, a two-dimensional format or a three-dimensional format. The machine-readable identifier facilitates automatic fabrication of molds from the images on an automation line of an RP apparatus. Once the mold images have been shelled and assigned identifiers, they are transmitted to a storage module 110, where they are placed in a queue.

Once the queue has accumulated a preset number of images, a height sorting module 112 may then sort the mold images in the queue according to their heights. The preset number of images may be defined in the software or manually entered by a technician, for example. The preset number may be determined by a daily manufacturing capacity of an RP facility, for example. This number may be further subdivided into sets. For example, if a given facility can process 1,000 images per day, those 1,000 images may be broken down into 20 sets of 50 images each.

During the sorting operations described herein, all aligners for a given patient may advantageously be retained in a contiguous group, also referred to as a case. In certain embodiments, however, the aligners in a given case may be arranged so that they are not contiguous. For example, the aligners from a given case may be positioned on a tray in non-contiguous locations that enable the density of aligners on the tray to be increased.

A case may contain aligners for both the patient's upper and lower arches. The upper aligners in a given case may have substantially the same heights and widths, and the lower aligners in a given case may also have substantially the same heights and widths. However, the upper aligners in a given case may have substantially different heights and/or widths from the lower aligners in the same case. Accordingly, the height of a given case is defined as the height of the tallest aligner in that case, and the width of a given case is defined as the width of the widest aligner in that case. The height sorting methods described herein refer to both sorting of aligners/images and sorting of cases, which include groups of aligners/images. Those of ordinary skill in the art will appreciate that the height sorting methods described herein may be advantageously applied to both sorting aligners/images individually and sorting cases of aligners/images.

The height sorting module 112 comprises a sorting algorithm that evaluates all of the cases in the queue in terms of their respective heights, assigns to each case a height-indicative value, and orders the cases in either ascending or descending order of the height-indicative values. Cases having similar heights are thus grouped or sequenced closely together. Grouping by height reduces the overall processing time for a given group of trays, because the processing time per tray for an RP apparatus is affected at least in part by tray height, as explained further below.

Figures 3A, 3B, 3C:
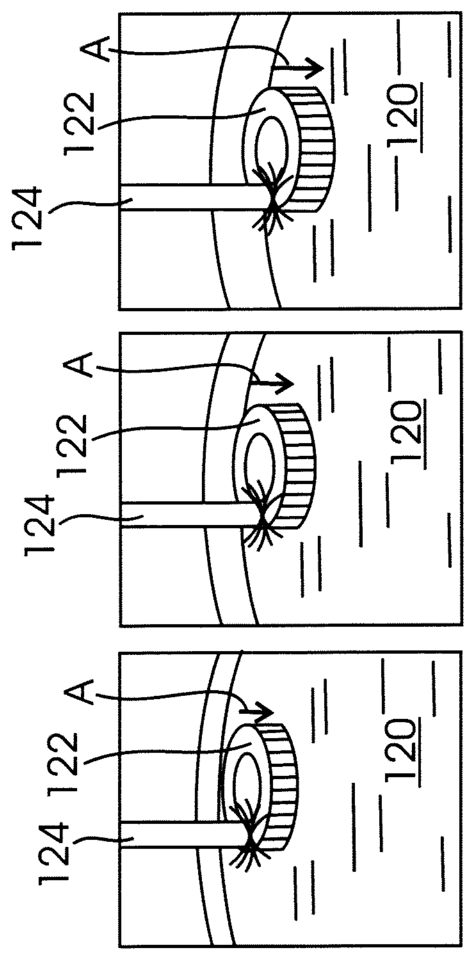
FIGS. 3A, 3B and 3C are perspective views of a sample image, illustrating the incremental lowering of the virtual tray as successive layers of material are applied to the image.

In a typical RP process, a tray of objects is produced layer by layer. For example, FIGS. 3A, 3B and 3C illustrate, schematically, a tray 120 on which a mold 122 is being formed, layer by layer, by an RP process. As the process begins, a thin layer of curable liquid is added to the tray. At locations on the tray where objects are to be formed, the liquid is cured to form the first layers of the objects. For example, the curing may be carried out with a laser 124, such as that shown in FIGS. 3A-3C. Alternatively, a flash of UV light may cure the liquid. After curing, the tray moves downward and another layer of material is added to the tray. Portions of the liquid are again cured to form the second layers of the objects. This process continues until the last layer is formed for the tallest object. In FIGS. 3A-3C the lengthening of the arrow A illustrates the downward movement of the tray 120 at each stage. At each stage the height of the mold 122 increases as successive layers of curable material are added.

In the layer by layer RP process described above, tray height is defined as the maximum vertical dimension of the mold images above the base level or zero level of the tray. Thus, the tallest mold on a given tray determines that tray's height, even if every other mold on that tray is considerably shorter than the tallest mold. The greater the tray height, the longer the RP apparatus takes to fabricate the molds in that tray, because the tray is not complete until the last layer has been applied to the tallest object on the tray. Thus, if each tray in a given group of trays contains at least one tall mold, then each of those trays will take a relatively long time to process. However, if the molds are grouped according to height, and molds of similar height are placed on the same trays, then those trays having only relatively short molds take less time to process than the trays containing only relatively tall molds, thus, the average per tray processing time for that group of trays is reduced.

Figure 4:
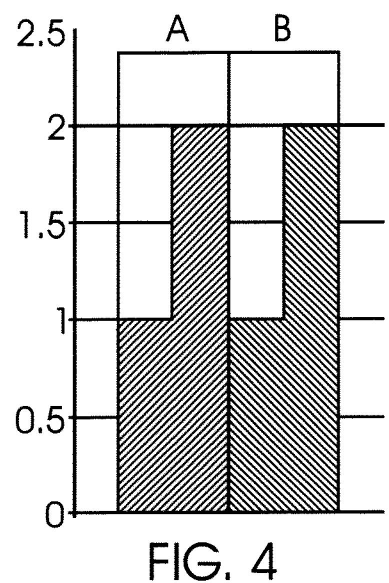
FIG. 4 is a graph illustrating an example of an inefficient distribution of mold images between virtual trays.
Figure 5:
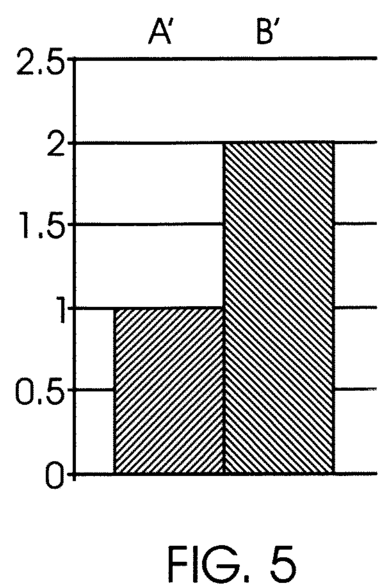
FIG. 5 is a graph illustrating an example of a more efficient distribution of mold images between virtual trays.

FIGS. 4 and 5 are bar graphs that help to illustrate the advantages of the present embodiments for efficiently sorting mold images by height. For each of these bar graphs, assume that there are four mold images to be mapped across two trays. A and B in FIG. 4, and A' and B' in FIG. 5. Of the four images, two have a height of 1", and two have a height of 2". In FIG. 4 the mold images are mapped onto the two trays such that each tray includes one image with a height of 1" and one image with a height of 2". As a result, each tray has a height equal to 2", and so the average virtual tray height is 2". In FIG. 5, however, the mold images are mapped onto the two trays such that tray A' includes two images with a height of 1" each, and tray B' includes two images with a height of 2" each. As a result, the height of tray A' is 1" and the height of tray B' is 2" for an average tray height of 1.5". Because the average tray height is lower in FIG. 5, the average processing time for trays A' and B' will be less than that for trays A and B in FIG. 4. Embodiments of the present height sorting module 112 arrange images across trays so that the height diversity of each tray is reduced, because cases are arranged in ascending or descending order. Each tray thus contains contiguous cases that have closely matched heights. The trays can thus be processed more efficiently, as illustrated by the examples of FIGS. 4 and 5.

Figure 6:
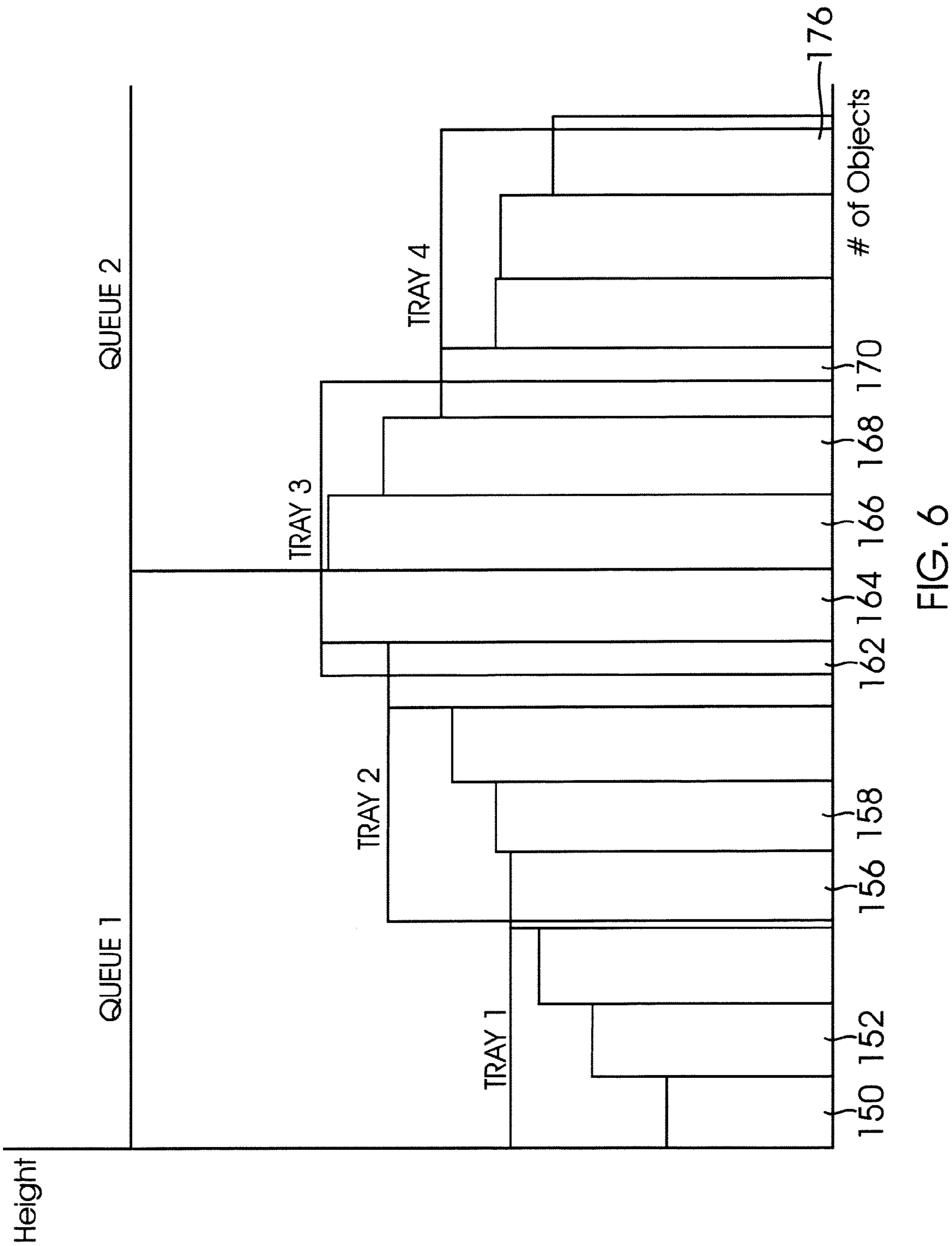
FIG. 6 is a graph illustrating a distribution of case heights across a series of trays.

Embodiments of the present height sorting module 112 may also alternate between ascending height sorting and descending height sorting. Thus, for example, when height sorting multiple sets or queues of images, a first queue may be sorted in ascending order, and a second queue may be sorted in descending order, a third queue ascending, a fourth queue descending, and so on. FIG. 6 illustrates an example of such alternating sorting. A first queue (QUEUE 1) contains eight cases 150, 152, . . . 164, and a second queue (QUEUE 2)

contains six cases 166, 168, . . . 176. In FIG. 6 each case is represented by a slender vertical rectangle. The height of each rectangle corresponds to the height of that case, and the width of each rectangle corresponds to the number of images in that case. As discussed above, the height of a given case is equal to the height of the tallest image in that case, and the number of images varies from one case to the next.

The cases 150, 152, . . . 164 of QUEUE 1 are divided across two complete trays (TRAY 1, TRAY 2) and a portion of a third tray (TRAY 3), while the cases of QUEUE 2 are divided across a portion of TRAY 3, all of TRAY 4 and a portion of a fifth tray (not shown). FIG. 6 illustrates that the height of each tray is equal to the height of the tallest case on that tray. Thus, for example, the height of TRAY 1 is equal to the height of the fourth case 156, even though only a small fraction of the images from that case are located on TRAY 1. Similarly, the height of TRAY 3 is equal to the height of the eighth case 164.

FIG. 6 also illustrates the advantages of the present embodiments for alternating between ascending height sorting and descending height sorting. The cases 150, 152, . . . 164 in QUEUE 1 are sorted in ascending height order, while the cases 166, 168, . . . 176 in QUEUE 2 are sorted in descending height order. TRAY 3 overlaps QUEUE 1 and QUEUE 2, and holds the eighth, ninth and tenth cases 164, 166, 168 and portions of the seventh and eleventh cases 162, 170. Because the later cases of QUEUE 1 are the taller cases in that queue and the earlier cases of QUEUE 2 are the taller cases in that queue, the cases located on TRAY 3 have a relatively small height diversity. Again, the height diversity of a tray is defined herein as the difference in height between the tallest case and the shortest case on the tray. Here, the tallest case on TRAY 3 is the eighth case 164, and the shortest case is the eleventh case 170. While the height diversity of the trays in FIG. 6 is not quantified, the height diversity of TRAY 3 is clearly smaller than what it would be if QUEUE 1 and QUEUE 2 were both sorted in ascending height order. In that situation the fourteenth case 176 would be contiguous with the eighth case 164 and the height diversity of TRAY 3 would be much greater. FIG. 6 thus helps to illustrate the advantages of the present alternating sorting in which contiguous cases at the borders of queues are more likely to be closely matched in height.

Once the mold images have been sorted by height, the mold images are buffered or stored in the storage module 110, and a layout module 114 begins a process of arranging or mapping the images onto virtual trays. In one embodiment, the layout module 114 maps the height-sorted mold images onto one or more virtual trays, with each tray having a rectangular area of fixed dimensions along the x and y axes. Those of ordinary skill in the art will appreciate that the size and/or shape of the virtual tray may vary from one mapping process to another. However, when arranging items on a given tray, the size and shape of that tray are fixed, and the present embodiments strive to increase the number and density of items that will be placed on that tray.

In the present embodiments, preferred arrangements of mold images on the virtual trays provide high density of items on the tray as measured in the x-y plane while maintaining a limited height diversity on the tray. Height diversity is defined as the value of the difference between the height of the tallest item on the tray and the height of the shortest item on the tray. A lesser height diversity is preferred over a greater height diversity, and the present embodiments achieve limited height diversity by first sorting the cases by height, and placing contiguous cases on the trays in groups.

As discussed above, in the present system and methods mold images may be processed in sets. A given set may contain any number of mold images and/or cases. For example, the present system may be configured to perform the height sorting operation described above with a set of 25 cases. A typical case contains 40 molds. Therefore, a set of 25 cases contains on average 1,000 molds. When mapping these molds onto multiple trays, the present embodiments estimate how many of the molds will fit on a first tray. The molds are then arranged according to the algorithms described below until the tray is full. If more molds than estimated will fit on the first tray, then additional molds are drawn from the set until the tray is full. Conversely, if the estimated number of molds will not fit on the first tray, then the excess molds are mapped onto a second tray. Mapping continues across trays until no more molds are left in the set. Frequently, the last tray for a given set of molds will be only partially filled. Mapping thus continues by adding molds from a subsequent set to the partially filled tray, then proceeding to a new tray with the remaining molds in that set once the tray is full. Since in certain embodiments contiguous sets of molds are sorted in alternating ascending and descending orders, trays that contain molds from contiguous sets advantageously maintain limited height diversity.

When a virtual tray has been filled with mold images, the virtual tray is sent to a slicing module 116. As discussed above, RP is a layer-based manufacturing technology in which batches of items are fabricated layer by layer. Each layer comprises horizontal slices of the mold images that overlap that layer. Thus, in the present system the slicing module 116 digitally divides the tray into a plurality of horizontal slices or layers, and the layers are then sent electronically to the RP apparatus 118. The RP apparatus 118 lays down a curable polymer, layer by layer, according to the slices generated by the slicing module 116.

Figure 7:
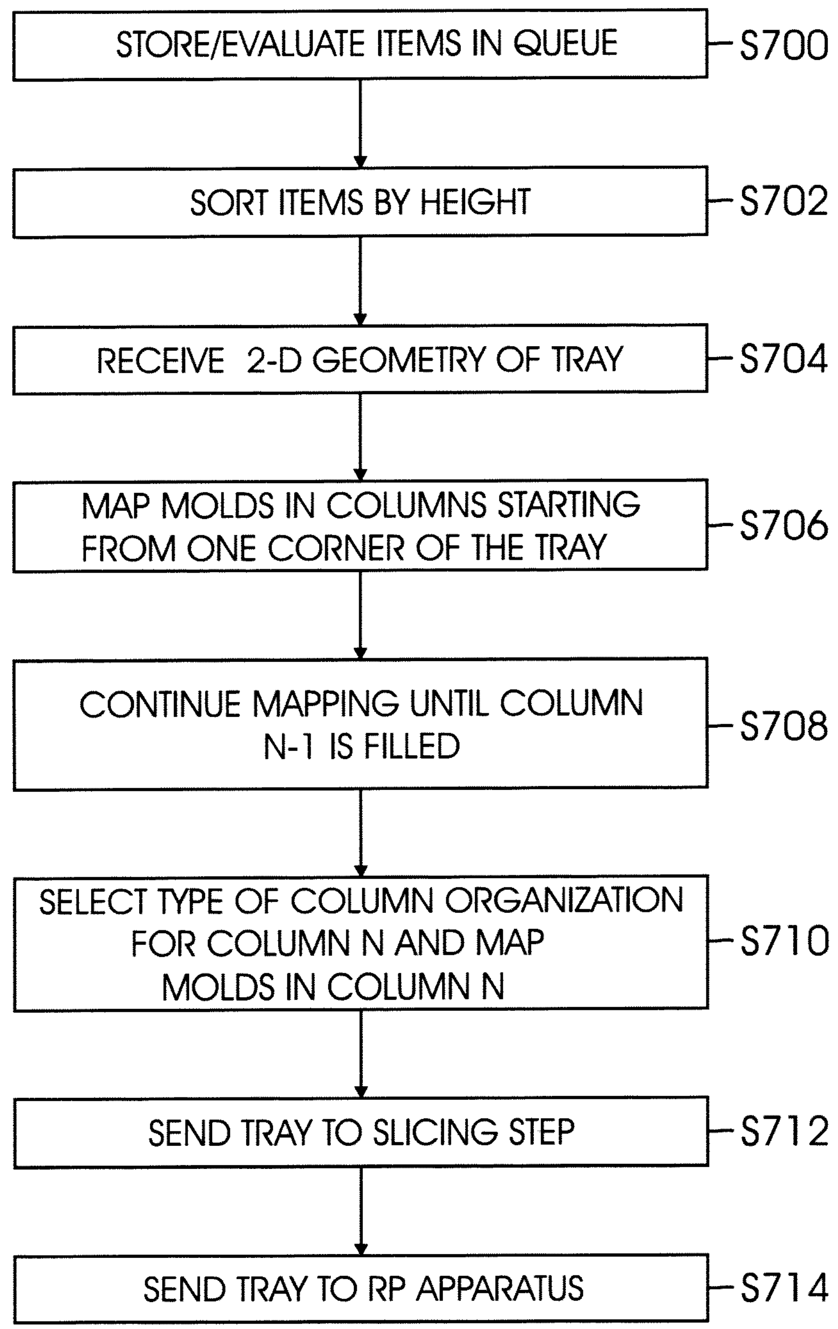
FIG. 7 is a flowchart illustrating steps in one embodiment of the present system and methods.

FIG. 7 is a flowchart illustrating the steps in one embodiment of the present methods of mapping a layout of items onto a field having fixed dimensions along the x and y axes. In certain embodiments the mapped items are mold images and the field is a virtual tray. In step S700, the storage module 110 (FIG. 2) stores the mold images in a queue, and the queue is continually evaluated to determine if the preset number of mold images have been stored in the queue. The preset number may be determined as discussed above, such as by a daily manufacturing capacity of an RP facility, for example. In step S702, the height sorting module 112 (FIG. 2) sorts the mold images in the queue by height, so that they can be mapped, in the subsequent mapping steps (described below), in a height-sorted order.

In step S704, the layout module 114 (FIG. 2) receives the x and y dimensions of the virtual tray. In step S706, the layout module 114 maps the mold images, in height-sorted order, on the virtual tray. In one embodiment the layout module 114 maps the mold images in N columns across the virtual tray, with each column extending substantially parallel with the y-axis. The x and y dimensions of the virtual tray thus assist the present system in determining the value of N, or how many columns will fit on the tray. In arranging the columns the layout module 114 may begin at coordinate (0,0) on the tray, which may correspond to a lower, left-hand corner of the tray.

In step S708, after the first column is filled, the layout module 114 proceeds with mapping the mold images into additional columns until column N−1 (the next to last column on the tray) is filled. Those of ordinary skill in the art will appreciate that columns need not be filled in any particular order. Thus, if the process first fills the leftmost column on the tray, the next column to be filled need not be the column that is contiguous with the leftmost column. Instead, the process may proceed by filling columns in any order, whether subsequent columns are contiguous or not.

In step S710, the type of column organization (described below) for column N (the last column on the tray) is determined and the mold images are mapped into column N according to the selected column organization scheme, thus filling the virtual tray. As one tray is filled, the mapping process continues with another virtual tray until no more mold images are left in the queue. If a partially filled tray results from exhausting the mold images in a given queue, mold images from a subsequent queue may be mapped onto the partially filled tray, as discussed above. After each virtual tray is filled it proceeds, in step S712, to the slicing operation. In step S712 the slicing module 116 digitally divides the tray into a plurality of horizontal slices or layers, and in step S714, the slices are sent to the RP apparatus so that the molds can be fabricated.

Figure 8:
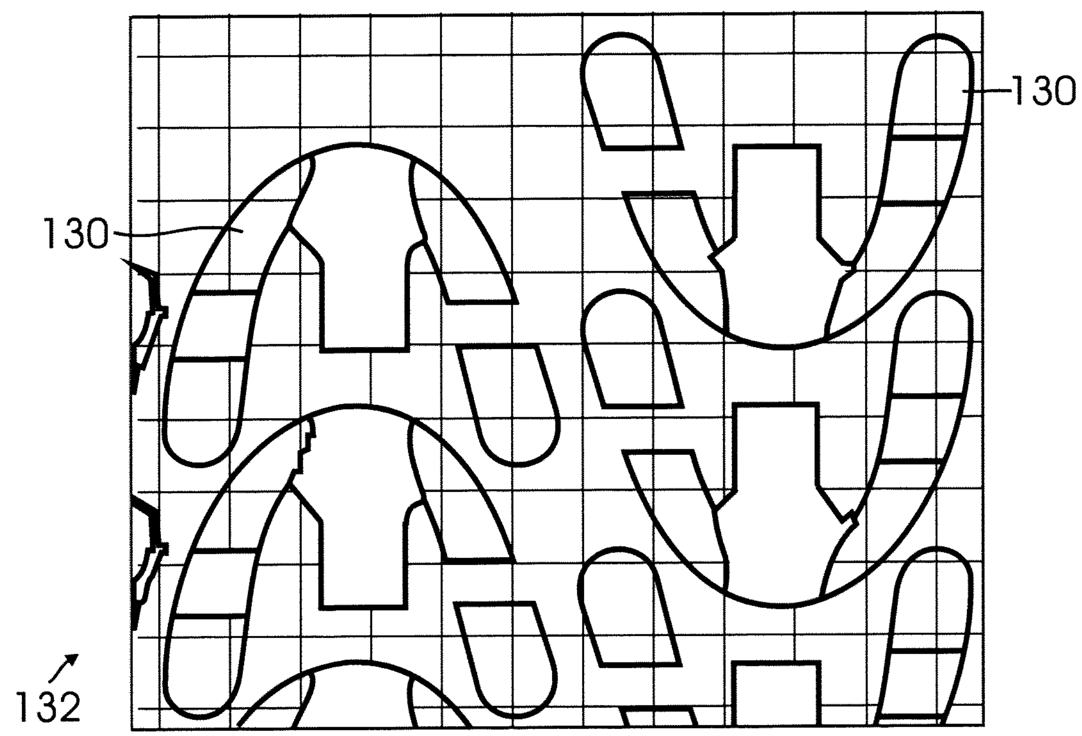
FIG. 8 is a plan view of a portion of a virtual tray, illustrating one embodiment of the present system and methods for mapping the objects on the tray.

In steps S706 and S708, the mapping of mold images into columns may proceed according to one or more mapping schemes or column organization plans. Software may select the type of column organization that will provide high mold image density for each column and/or for each tray. For example, FIG. 8 illustrates mold images 130 arranged on a virtual tray 132 according to one embodiment of a column organization plan. According to the plan each column of mold images 130 is left-justified on the virtual tray 132, and the mold images 130 in each column are rotated 180° about the z-axis with respect to the mold images 130 in the previous column. This alternating column layout enables adjacent columns to be squeezed more tightly together, eliminating empty space between columns and saving on material costs during the RP process. The ability to more densely pack the columns of mold images stems at least part from the shapes of the mold images, which mirror the shapes of human dental arches. The legs of the arches generally diverge toward the back of the mouth. Thus, when placing two mold images side-by-side on a tray, the area of the empty space between the images can be reduced by rotating one of the images 180° about the z-axis with respect to the other image. Those of ordinary skill in the art will appreciate that the spacing shown between columns in FIG. 8 is for illustration purposes only, and the columns could actually be squeezed together more closely than as shown.

Figure 9:
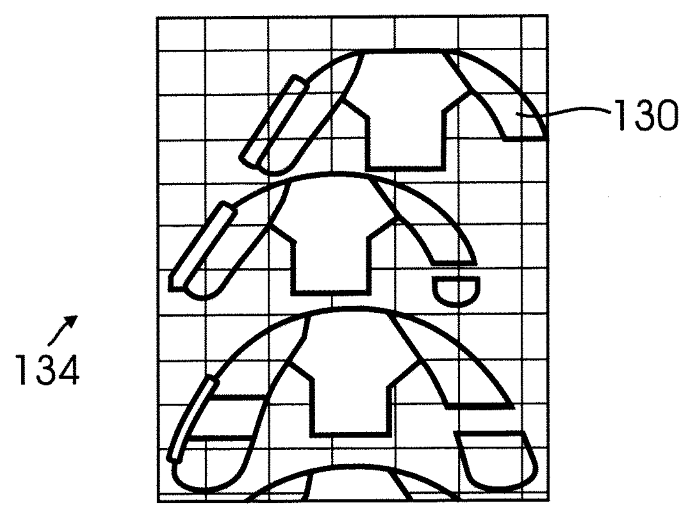
FIG. 9 is a plan view of a portion of a virtual tray, illustrating another embodiment of the present system and methods for mapping the objects on the tray.

FIG. 9 illustrates a virtual tray 134 including a plurality of mold images 130 arranged according to another embodiment of a column organization plan. Whereas in FIG. 8 all the columns of mold images are left-justified, in FIG. 9 some mold images 130 within each column are shifted along the x-axis so that they may be more tightly packed along the y-axis with neighboring mold images 130. Each image may be moved left or right along the x-axis to find the location on the x-axis in which the image can be moved closest (along the y-axis) to the image immediately below it in the column. As shown in FIG. 9, moving the top-most image 130 slightly to the right allows it to be moved slightly downward, thus reducing the area of empty space between the images 130. However, as a mold image 130 is moved along the x-axis, it may intrude into the adjacent column, which may require that column to be shifted along the x-axis to eliminate any interference. In such circumstances, software in the present system may balance the competing interests of compacting mold images 130 along the y-axis with compacting columns along the x-axis and determine whether and how far each image 130 may be shifted along the x-axis.

Figure 10:
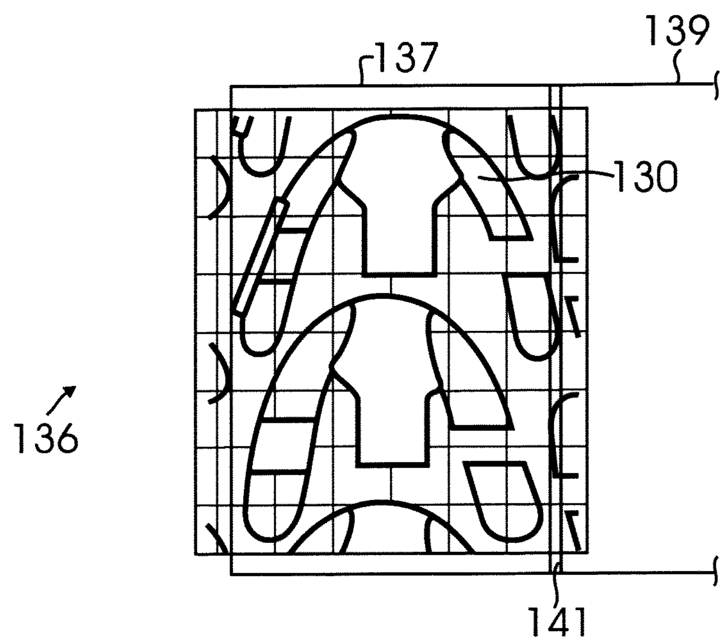
FIG. 10 is a plan view of a portion of a virtual tray, illustrating another embodiment of the present system and methods for mapping the objects on the tray.

FIG. 10 illustrates a virtual tray 136 including a plurality of mold images 130 arranged according to another embodiment of a column organization plan known as inter-column fitting. When objects are arranged according to an inter-column fitting plan, adjacent columns overlap one another such that spacing between adjacent columns is reduced. With reference to FIG. 10, a first imaginary box 137 is drawn around a first column of mold images, and a second imaginary box 139 is drawn around a second, adjacent column of mold images. Each of the imaginary boxes 137, 139 is drawn such that its side edges touch the leftmost and rightmost extents of the mold images in the respective column. The leftmost edges of some images in the second column extend into the first imaginary box 137, and the rightmost edges of some images in the first column extend into the second imaginary box 139, thus creating an overlapping region 141 of the boxes. This overlapping arrangement reduces spacing between columns as compared to an arrangement where the imaginary boxes have no overlap.

After column N−1 of each tray has been filled, there is a finite width left for the last column (column N). Sometimes column N has a width that enables one last column of 180°-rotated images to be placed with very little wasted space. Sometimes, however, column N may include substantially greater width than is needed to place just one more column of 180°-rotated images, but not enough width to place two more columns. In such situations, software of the present system may select a type of column organization that provides high mold image density for column N based upon the available width. For example, the software may determine that the greatest density of mold images can be achieved by selecting a column organization plan such as those shown in FIGS. 11 and 12.

Figure 11:
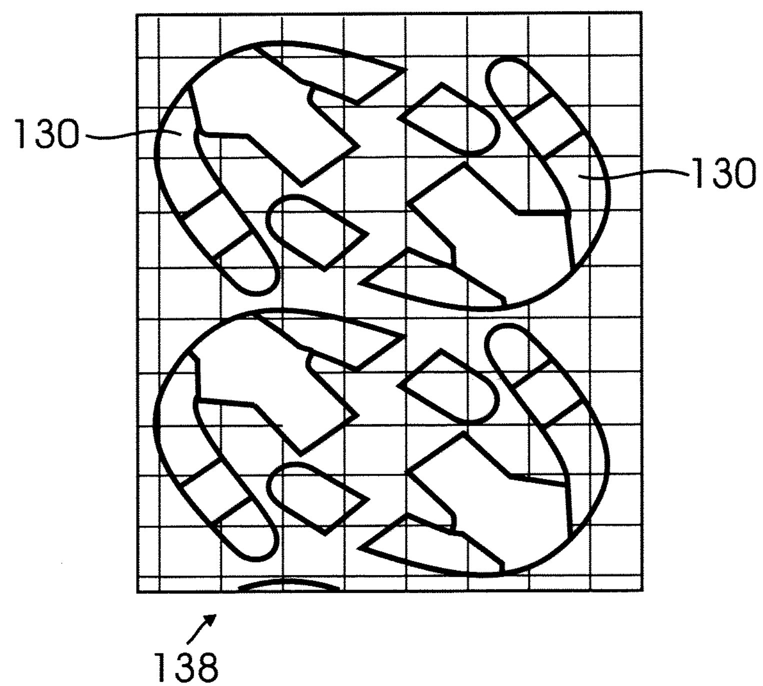
FIG. 11 is a plan view of a portion of a virtual tray, illustrating another embodiment of the present system and methods for mapping the objects on the tray.

In FIG. 11 a virtual tray 138 contains a plurality of mold images 130, wherein the images are grouped in pairs. Within each pair the arches of each image open toward one another, and the legs of the images substantially interlock. However, those of ordinary skill in the art will appreciate that the legs of the images need not interlock. As further illustrated in FIG. 11, each pair is rotated about the z-axis. Whereas in FIGS. 8-10 the images 130 are arranged such that the arch of each image opens substantially directly toward the x-axis or directly away from the x-axis, in FIG. 11 the arch of each image opens at an angle with respect to the x-axis. In certain embodiments the angle may be between about 5° and about 65°. In certain other embodiments the angle may be between about 15° and about 55°. In certain other embodiments the angle may be between about 25° and about 45°, and in certain other embodiments the angle may be about 35°.

Figure 12:
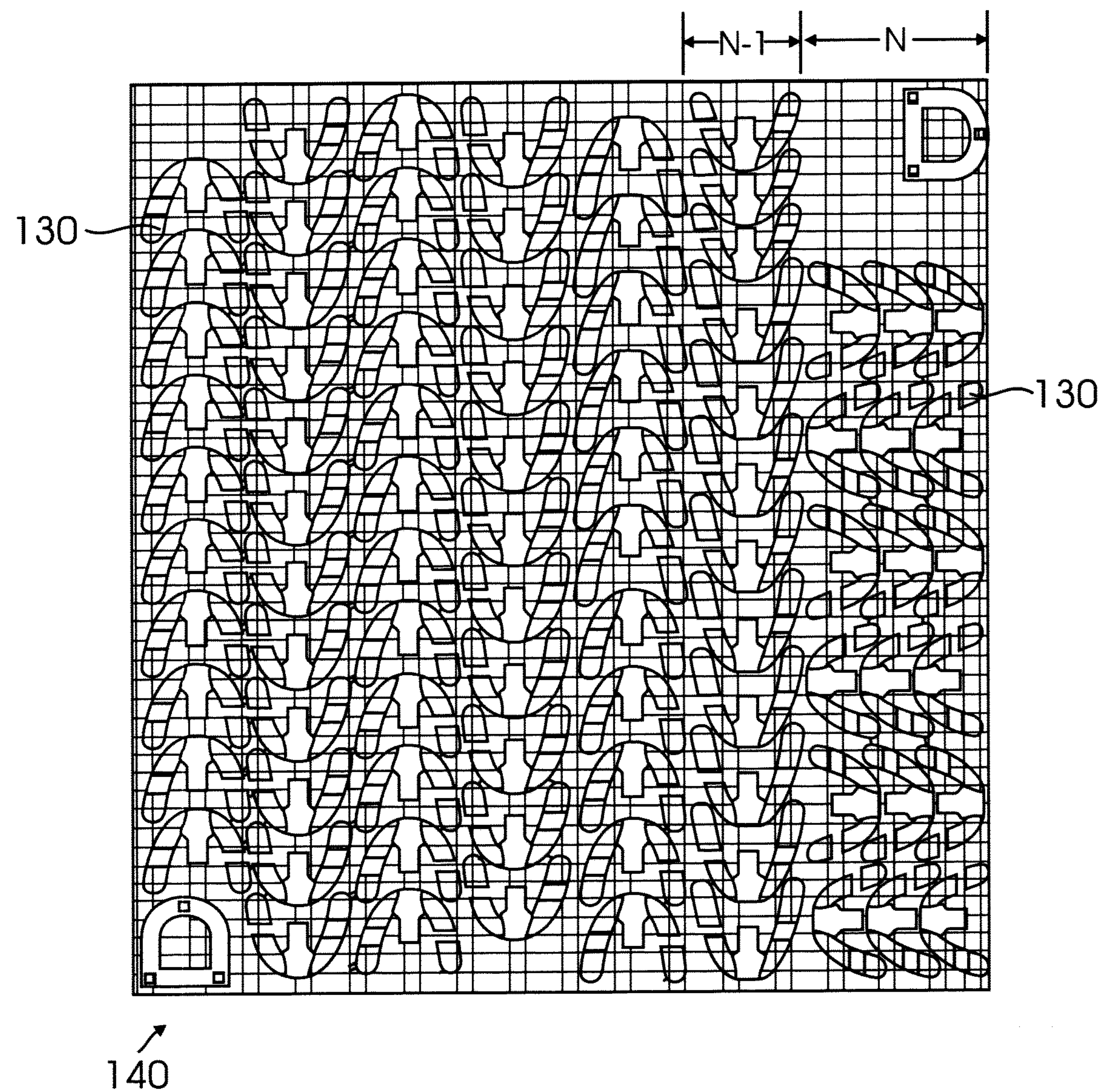
FIG. 12 is a plan view of a virtual tray, illustrating embodiments of the present system and methods for mapping the objects on the tray.

FIG. 12 illustrates another embodiment of the present column organization plans for column N of a virtual tray 140. In FIG. 12 a plurality of mold images 130 are arranged in columns to the left side of the tray 140 according to the alternating arrangement shown in FIG. 8 and described above. In column N, however, each of the images 130 is rotated approximately 90° or 270° with respect to the images 130 in column N−1. Rows of three images 130 each are stacked vertically in column N, with the images 130 in each row opening in a common direction, and images 130 in adjacent rows opening in opposite directions. Each image 130 in column N opens substantially directly toward the y-axis or directly away from the y-axis.

In certain of the present embodiments, mapping of objects onto the tray proceeds from the left side of the tray toward the right side, with each successive column being placed closely adjacent the previous column. Thus, in the column organization plans described above the last column to be placed on the tray (column N) is located on the right side of the tray (FIG. 12). However, a multitude of alternative mapping progressions are contemplated. Therefore, those of ordinary skill in the art will appreciate that column N denotes the last (in the temporal sense) column to be mapped on the tray, and column N could be located anywhere on the tray, including on the left side or in the middle. For example, a first column may be mapped along the left edge of the tray, then a second column may be mapped along the right edge of the tray, a third column adjacent the first column, a fourth column adjacent the second column, etc. According to this progression column N would be positioned near the center of the tray.

Figure 13:
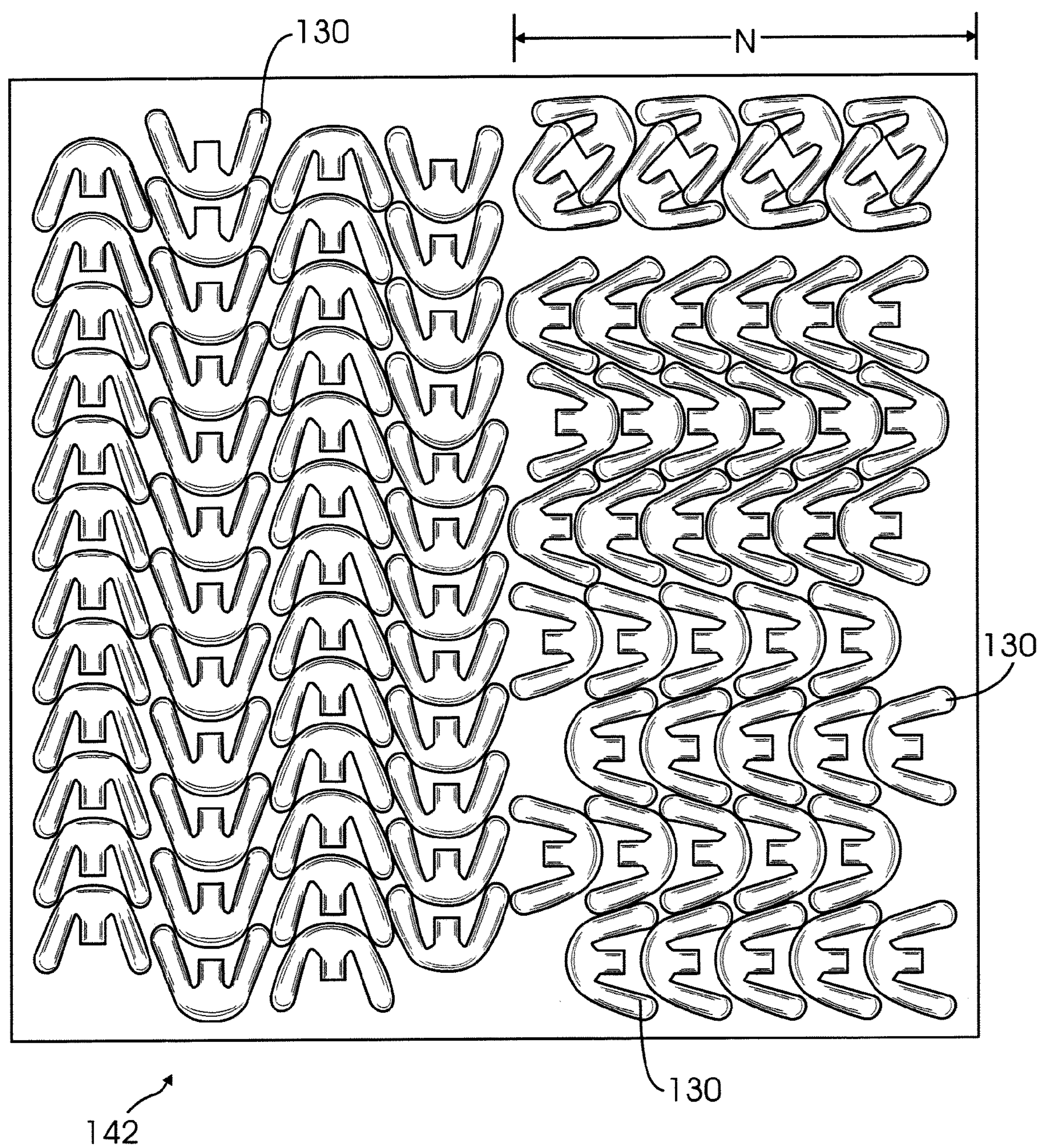
FIG. 13 is a plan view of a virtual tray, illustrating alternative embodiments of the present system and methods for mapping the objects on the tray.

FIG. 13 illustrates another mapping scheme according to the present embodiments. In FIG. 13, column N is positioned at the right-hand side of the tray 142. However, a width of column N is greater than the width necessary to place two columns of 180°-rotated images. Nevertheless, rather than proceeding with mapping additional columns of 180°-rotated images 130 as in the embodiments described above, another method of organizing column N includes mapping several vertically stacked rows of images 130, and at least one row of interlocked pairs of images 130, into column N. As FIG. 13 illustrates, the present embodiments are not limited to mapping 180°-rotated columns onto the tray 142 until the width of the remaining space on the tray 142 is between one and two columns. Instead, mapping column N according to a column organization plan may proceed regardless of the width of column N. As FIG. 13 further illustrates, the column organization plan for column N is not limited to one orientation pattern. Rather, the column organization plan may combine two or more orientation patterns, such as the illustrated combination of vertically stacked rows of images 130 and at least one row of interlocked pairs of images 130.

Figure 14:
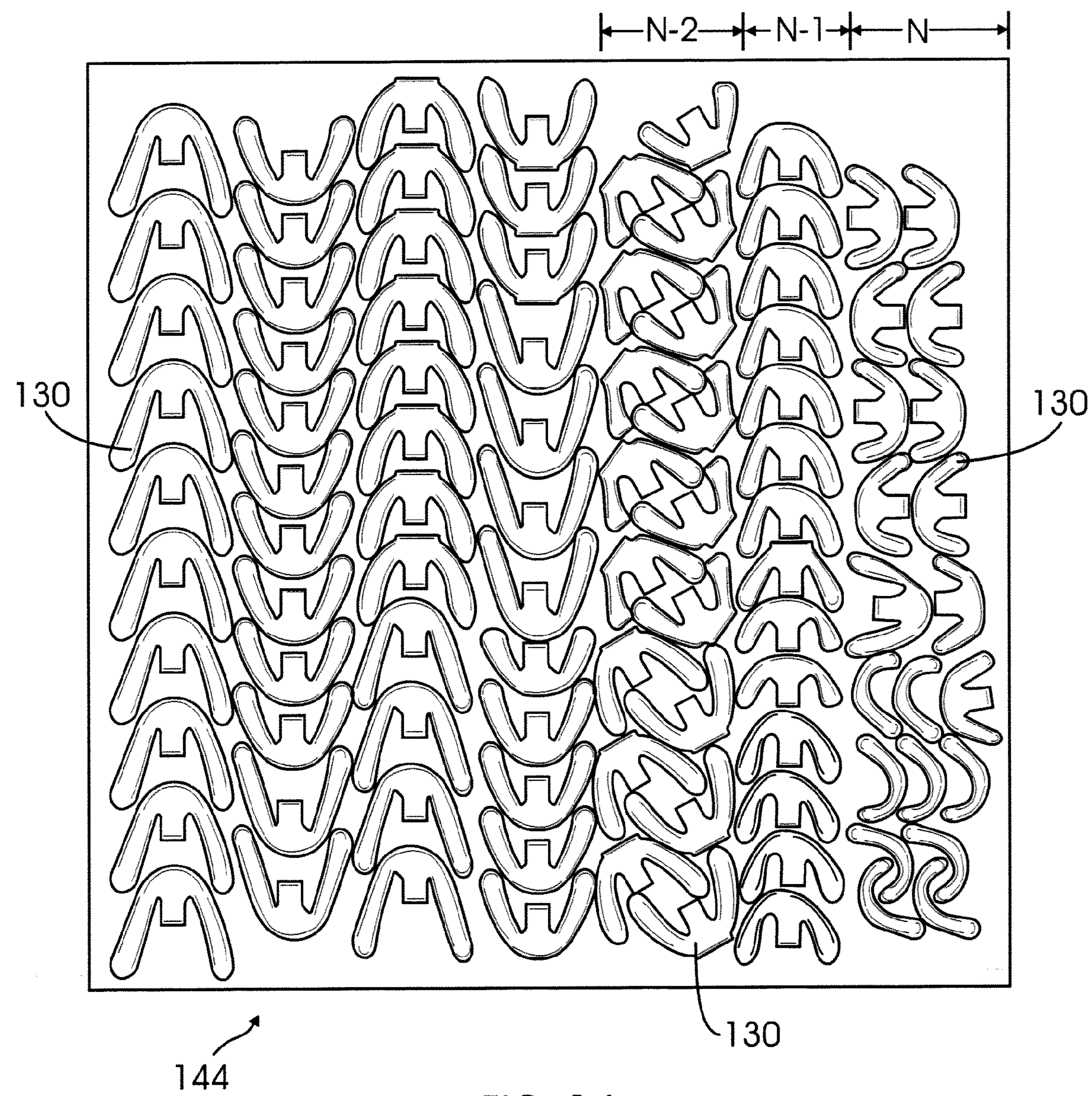
FIG. 14 is a plan view of a virtual tray, illustrating alternative embodiments of the present system and methods for mapping the objects on the tray.

FIG. 14 illustrates another mapping scheme according to the present embodiments. In FIG. 14 multiple columns on the tray 144 are arranged according to various column organization plans. For example, several columns toward the left-hand side of the tray are arranged in repeating 180°-rotated columns. Column N−2 includes several interlocked pairs of images 130, and column N includes several vertically stacked horizontal rows and several interlocked pairs of images 130. As FIG. 14 illustrates, the present embodiments are not limited to arranging only column N according to a column organization plan. Rather, any or all columns on the tray 144 may be arranged according to a column organization plan. Further, any of the column organization plans may combine two or more orientation patterns, such as the illustrated combination of vertically stacked rows of images 130 and at least one row of interlocked pairs of images 130 in row N of FIG. 14.

In any of the column organization plans and/or tray organization plans described herein, the mold images may be sorted by width so that mold images of similar widths are placed in the same column or row. Sorting the mold images by width contributes to greater density of mold images on the tray, since very wide images are preferably not placed on the virtual tray in the same column as very narrow images. When wide images are placed in the same column with narrow images, the wider images determine the column width and spaces on either side of the narrow images tend to be wasted. Sorting mold images by width prior to mapping them into columns reduces the tendency for such space wasting. Additionally, in the present embodiments mold images may be sorted by width in descending order, so that wider mold images are placed on the tray prior to narrower mold images, and the mold images generally decrease in width from the first column toward the last column (column N). Sorting the images by width in descending order creates greater flexibility for positioning the images in the later columns, including in column N, since there are more options for positioning narrow images within a given space than there are for positioning wide images.

In any of the column organization plans and/or tray organization plans described herein, the mold images may be sorted according to a general shape of each mold image. The shapes of the images mirror the shapes of human dental arches, which generally fall into one of three shape categories: U-shaped with a rounded anterior portion, U-shaped with a square anterior portion, and V-shaped. When positioning mold images on a tray it is advantageous to position images of similar shape in the same column, and to position columns of similarly shaped images next to one another. Such grouping by shape enables images to be more tightly packed within a tray. Accordingly, the present methods for mapping mold images may include a step of sorting the images according to shape. Shape sorting may occur in addition to, or instead of, width sorting. Shape sorted images may be placed sequentially on trays so that similarly shaped images are grouped together.

The above description presents the best mode contemplated for carrying out the present system and methods for increasing efficiency in rapid prototyping processes, and of the manner and process of making and using them, in such full, clear, concise, and exact terms as to enable any person skilled in the art to which they pertain to make this system and use these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A system for sorting images of objects and mapping the images on a work area having a fixed dimension along an x-axis and a fixed dimension along a y-axis, comprising:

a model generation module configured to generate digitized three-dimensional images of the objects;

a storage module configured to receive the images from the model generation module and to store the images in a queue;

a height sorting module configured to sort the images in the queue into a height-sorted order, wherein height is defined along a z-axis that is orthogonal to the x-axis and the y-axis, and wherein the queue includes a tallest image; and a layout module configured to map the images in a plurality of columns on the work area in accordance with the height-sorted order, each column having a height not exceeding a height of the tallest image.

2. The system of claim 1, wherein the height sorting module is configured to evaluate the images in the queue based upon a height of each image, assign to each image a height-indicative value, and order the images in either ascending or descending order based upon the height-indicative value, such that images having similar heights are grouped or sequenced closely together.

3. The system of claim 2, wherein the images in the queue are grouped into cases, wherein a height of each case is defined as the height of the tallest image in the case, and wherein the height sorting module is configured to evaluate the cases in the queue based upon the height of each case, assign to each case a height-indicative value, and order the cases in either ascending or descending order based upon the height-indicative value, such that cases having similar heights are grouped or sequenced closely together.

4. The system of claim 1, wherein the layout module is configured to:

(a) map the images sequentially into a first column of a plurality of columns on the work area until the first column is filled;

(b) map the images into a subsequent column until the subsequent column is filled;

(c) repeat step (b) until only a last column in the plurality of columns remains to be filled, or until no more images remain in the queue; and (d) map the images into the last column in accordance with a column organization plan.

5. The system of claim 1, wherein the column organization plan comprises rotating the images in the last column about the z-axis with respect to the images in an adjacent column.

6. The system of claim 1, wherein the column organization plan comprises grouping the images in the last column in pairs.

7. The system of claim 1, further comprising a receiving module configured to receive data regarding the images.

8. The system of claim 1, further comprising editing module configured to remove portions from at least some of the images.

9. The system of claim 8, wherein the editing module is further configured to add at least one identifier to each image.

10. The system of claim 1, further comprising an identifier module configured to add at least one identifier to each image.

11. The system of claim 1, further comprising a slicing module configured to digitally slice the images into a plurality of layers.

12. The system of claim 11, wherein the slicing module is further configured to provide information representing the layers to a rapid prototyping apparatus configured to fabricate the objects in accordance with the information representing the layers.

13. The system of claim 1, wherein the layout module is further configured to map the images on at least one successive work area until all the images in the queue have been mapped.

14. The system of claim 1, wherein width is defined along the x-axis, and wherein the layout module is further configured to map the images on the work area according to the width of each image.

15. The system of claim 14, wherein the layout module is further configured to group together images having similar widths.

16. The system of claim 15, wherein the layout module is further configured to organize each column in a predefined order according to the widths of the images.

17. The system of claim 1, wherein the layout module is further configured to use inter-column fitting to reduce spacing between adjacent columns.

18. The system of claim 1, wherein the images are digitized, three-dimensional, graphic representations of dental arches.

19. The system of claim 1, further comprising a rapid prototyping apparatus configured to fabricate the objects from the images.

20. A system for mapping object images onto a work area defined by a fixed dimension along an x-axis and a fixed dimension along a y-axis, the system comprising:

a storage module configured to store digitized object images in a queue;

a sorting module configured to sort the images in the queue in a predetermined order according to a selected dimension of the images; and a layout module configured to map the images in a single layer on the work area so as to maximize the number of images mapped onto the work area.

21. The system of claim 20, wherein the dimension is selected from the group consisting of height and width, wherein height is defined along a z-axis orthogonal to the work area, and wherein width is defined along the x-axis.

22. The system of claim 21, wherein the dimension is height, wherein the system further comprises a height-sorting module configured to sort the images in the queue into a height-sorted order, wherein the queue includes a tallest image, and wherein the layout module is configured to map the images in a plurality of columns on the work area in accordance with the height-sorted order, each column having a height not exceeding a height of the tallest image.

23. The system of claim 22, wherein the height sorting module is configured to evaluate the images in the queue based upon a height of each image, assign to each image a height-indicative value, and order the images in either ascending or descending order based upon the height-indicative value, such that images having similar heights are grouped or sequenced closely together.

24. The system of claim 23, wherein the images in the queue are grouped into cases, wherein a height of each case is defined as the height of the tallest image in the case, and wherein the height sorting module is configured to evaluate the cases in the queue based upon the height of each case, assign to each case a height-indicative value, and order the cases in either ascending or descending order based upon the height-indicative value, such that cases having similar heights are grouped or sequenced closely together.

25. The system of claim 20, wherein the layout module is configured to:

(a) map the images sequentially into a first column of a plurality of columns on the work area until the first column is filled;

(b) map the images into a subsequent column until the subsequent column is filled;

(c) repeat step (b) until only a last column in the plurality of columns remains to be filled, or until no more images remain in the queue; and (d) map the images into the last column in accordance with a column organization plan.

26. The system of claim 25, wherein the column organization plan comprises rotating the images in the last column about the z-axis with respect to the images in an adjacent column.

27. The system of claim 25, wherein the column organization plan comprises grouping the images in the last column in pairs.

28. The system of claim 20, further comprising a slicing module configured to digitally slice the images into a plurality of layers.

29. The system of claim 28, wherein the slicing module is further configured to provide information representing the layers to a rapid prototyping apparatus configured to fabricate objects in accordance with the information representing the layers.

30. The system of claim 20, wherein the layout module is further configured to map the images on at least one successive work area until all the images in the queue have been mapped.

31. The system of claim 21, wherein the layout module is further configured to map the images on the work area according to the width of each image.

32. The system of claim 31, wherein the layout module is further configured to group together images having similar widths.

33. The system of claim 32, wherein the layout module is further configured to organize each column in a predefined order according to the widths of the images.

34. The system of claim 22, wherein the layout module is further configured to use inter-column fitting to reduce spacing between adjacent columns.

35. A system for manufacturing objects on a tray defined by a fixed dimension along an x-axis and a fixed dimension along a y-axis, the system comprising:

a model generation module configured to generate digitized three-dimensional images of the objects;

a storage module configured to store the images in a queue;

a sorting module configured to sort the images in the queue in a predetermined order according to a selected dimension of the images;

a layout module configured to map the images on the tray so as to maximize the number of images mapped onto the tray and to generate information representing the mapped images on the tray along the x-axis and the y-axis;

a slicing module responsive to the layout module and configured to digitally slice the mapped images into a plurality of horizontal layers and to generate information representing the layers; and a rapid prototyping apparatus responsive to the slicing module and configured to fabricate the objects on the tray in accordance with the information representing the layers.

36. The system of claim 35, wherein the dimension is selected from the group consisting of height and width, wherein height is defined along a z-axis orthogonal to the tray, and wherein width is defined along the x-axis.

37. The system of claim 36, wherein the dimension is height, wherein the system further comprises a height-sorting module configured to sort the images in the queue into a height-sorted order, wherein the queue includes a tallest image, and wherein the layout module is configured to map the images in a plurality of columns on the tray in accordance with the height-sorted order, each column having a height not exceeding a height of the tallest image.

38. The system of claim 37, wherein the height sorting module is configured to evaluate the images in the queue based upon a height of each image, assign to each image a height-indicative value, and order the images in either ascending or descending order based upon the height-indicative value, such that images having similar heights are grouped or sequenced closely together.

39. The system of claim 38, wherein the images in the queue are grouped into cases, wherein a height of each case is defined as the height of the tallest image in the case, and wherein the height sorting module is configured to evaluate the cases in the queue based upon the height of each case, assign to each case a height-indicative value, and order the cases in either ascending or descending order based upon the height-indicative value, such that cases having similar heights are grouped or sequenced closely together.

40. The system of claim 35, wherein the layout module is configured to:

(a) map the images sequentially into a first column of a plurality of columns on the tray until the first column is filled;

(b) map the images into a subsequent col the subsequent column is filled;

(c) repeat step (b) until only a last column in the plurality of columns remains to be filled, or until no more images remain in the queue; and (d) map the images into the last column in accordance with a column organization plan.

41. The system of claim 40, wherein the column organization plan comprises rotating the images in the last column about the z-axis with respect to the images in an adjacent column.

42. The system of claim 40, wherein the column organization plan comprises grouping the images in the last column in pairs.

43. The system of claim 35, wherein the layout module is further configured to map the images on at least one successive work area until all the images in the queue have been mapped.

44. The system of claim 36, wherein the layout module is further configured to map the images on the work area according to the width of each image.

45. The system of claim 44, wherein the layout module is further configured to group together images having similar widths.

46. The system of claim 45, wherein the layout module is further configured to organize each column in a predefined order according to the widths of the images.

47. The system of claim 37, wherein the layout module is further configured to use inter-column fitting to reduce spacing between adjacent columns.

* * * * *